US009171210B2

(12) United States Patent
Xu et al.

(10) Patent No.: US 9,171,210 B2
(45) Date of Patent: Oct. 27, 2015

(54) METHOD AND APPARATUS FOR OBJECT CLASSIFIER GENERATION, AND METHOD AND APPARATUS FOR DETECTING OBJECT IN IMAGE

(71) Applicant: CANON KABUSHIKI KAISHA, Tokyo (JP)

(72) Inventors: Lifeng Xu, Beijing (CN); Bo Wu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/850,914

(22) Filed: Mar. 26, 2013

(65) Prior Publication Data

US 2013/0259372 A1 Oct. 3, 2013

(30) Foreign Application Priority Data

Mar. 28, 2012 (CN) .......................... 2012 1 0085214

(51) Int. Cl.
 *G06K 9/00* (2006.01)
 *G06K 9/46* (2006.01)
(52) U.S. Cl.
 CPC .......... *G06K 9/00624* (2013.01); *G06K 9/4614* (2013.01)
(58) Field of Classification Search
 USPC .......................................... 382/103, 170, 218
 See application file for complete search history.

(56) References Cited

U.S. PATENT DOCUMENTS

| 7,099,510 | B2 * | 8/2006 | Jones et al. | 382/225 |
| 8,024,189 | B2 * | 9/2011 | Zhang et al. | 704/246 |
| 2004/0258307 | A1 * | 12/2004 | Viola et al. | 382/190 |
| 2005/0271245 | A1 * | 12/2005 | Ai et al. | 382/100 |
| 2012/0069003 | A1 * | 3/2012 | Birkbeck et al. | 345/419 |
| 2014/0204238 | A1 * | 7/2014 | Cao et al. | 348/222.1 |

OTHER PUBLICATIONS

P. Viola, et al., Rapid object detection using a boosted cascade of simple features, IEEE CVPR, 2001, pp. 1-9.
N. Dalal et al., Histograms of oriented gradients for human detection, IEEE CVPR, 2005, p. 1-8.
Q. Zhu et al., Fast Human detection using a cascade of histograms of oriented gradients, Mitsubishi Electric Research Laboratories, IEEE CVPR, Jun. 2006, pp. 1-10.
G. Duan et al., Boosting associated pairing comparison features for pedestrian detection, Ninth IEEE International Workshop on Visual Surveillance, 2009, pp. 1097-1104.
C. Huang et al., High performance object detection by collaborative learning of joint ranking of granules features, IEEE CVPR, 2010, pp. 1-8.
Y. Freund et al., A decision-theoretic generalization of on-line learning and an application to boosting, Second European Conference on Computational Learning Theory, 1995, pp. 1-15.

\* cited by examiner

*Primary Examiner* — Yon Couso
(74) *Attorney, Agent, or Firm* — Canon USA, Inc. IP Division

(57) ABSTRACT

The present invention provides method and apparatus for object classifier generation, and method and apparatus for detecting object in image. The method for generating a two-cell structure feature descriptor of a two-cell structure composed of a center cell and a neighbor cell in an image region, wherein the neighbor cell is one of eight cells around and adjacent to the center cell, the method comprising: calculating step for calculating statistics of gradients in the center cell and the neighbor cell respectively; and comparing step for comparing the calculated statistics of gradients in the center cell and the neighbor cell, so as to obtain a two-cell structure feature descriptor for describing the feature of the two-cell structure, and
wherein the two-cell structure feature descriptor is one bit binary value.

20 Claims, 8 Drawing Sheets

METHOD AND APPARATUS FOR OBJECT CLASSIFIER GENERATION, AND METHOD AND APPARATUS FOR DETECTING OBJECT IN IMAGE

This application claims priority from Chinese patent application number CN201210085214.4 of Mar. 28, 2012, which is incorporated by reference herein in its entirety

BACKGROUND OF THE INVENTION

1. Field of the Invention

The present invention generally relates to image detection. In particular, the present invention relates to method and apparatus for object classifier generation, and further relates to method and apparatus for detecting an object in an image.

2. Description of the Related Art

Object detection for an image, such as, human detection, has very important applications in video surveillance, content-based image/video retrieval, video annotation, and assisted living. There is a vast literature on techniques of human detection. Most of them focus on the generation of a classifier, which is substantially essential and critical for object detection. Generally, a classifier usually relates to one kind of object and is used for detecting whether such kind of object exists in an image to be detected.

One thread, among the successful approaches, has been to build on the pioneering work of Viola and Jones for face detection [Document 1]. In Document 1, Haar-like features are calculated via the integral image and a novel cascade structure of classifiers is learned by Adaboost. Adaboost is well known in the art and provides an effective learning process and strong bounds on generalized performance [Document 6]. Such learning-based methods have come to be dominant currently; key issues here are the features and the learning algorithms that are used.

In 2005, Dalal proposed the normalized histogram of oriented gradients (HOG) descriptor for human detection [Document 2], as shown in FIG. 1A, which illustrates histogram of oriented gradients in the prior art as described in Document 2. Each detection window is divided into cells having a size of 8*8 pixels and each group of 2*2 cells is integrated into a block, so blocks overlap with each other. Each cell consists of a 9-bin HOG and each block contains a concatenated vector of all its cells. Each block is thus represented by a 36-D feature vector that is normalized to an L2 unit length. Each 64*128 sample image is represented by 7*15 blocks, giving a total of 3780 features per detection window, which is usually expressed as a feature vector f=[ ..., ..., ... ]. These features are then used to train a linear SVM classifier. An overview of the method disclosed in Document 2 is shown in FIG. 1B. The HOG features give very good performance for human detection.

In 2006, Zhu calculated the HOG features via integral images and integrated the cascade structure classifier to speed up the method disclosed in Document 2 [Document 3]. The 36-D block feature vector is normalized to a L1 unit length and then used to build a SVM weaker classifier. The framework of the method disclosed in Document 3 is shown in FIG. 1C. The method disclosed in Document greatly improves the detection speed while maintaining an accuracy level similar to the method disclosed in Document 3.

However in both methods disclosed in Document 2 and Document 3, a local contrast normalization step within each block of HOG is critical for good performance. However, many division operations in the normalization step will significantly increase the computation overhead, especially for the embedding system.

Recently, some comparison features are proposed for human detection such as Associated Pairing Comparison Features (APCF) [Document 4] and Joint Ranking of Granules Features (JROG) [Document 5].

In Document 4, APCF is based on simple pairing comparison of color and gradient orientation in granular space which is called PCC and PCG respectively, and several PCC or PCG features are associated to form an APCF feature. APCF features are then used to build a cascade structure classifier, as shown in FIG. 1D, in which the left portion illustrates pairing comparison of color, and the right portion illustrates pairing comparison of gradient. Due to rich pairs of granules in the granular space such simple APCF features achieve more accurate detection results than the method disclosed in Document 3. The detection speed is similar to the method disclosed in Document 3.

JROG is a simplified form of APCF features. In Document 5, JROG features are used to build a full body detector and several part detectors to keep a high detection accuracy which may decrease due to the simplification of JROG. Eventually, the method disclosed in Document 5 achieves comparable detection accuracy and higher efficiency than the method disclosed in Document 4. The overview of both methods disclosed in Documents 4 and 5 can be illustrated as FIG. 1E.

One advantage of above assembled binary comparison features is their simplicity in form. No normalization step is required during calculation. Another advantage is that abundant granules encode richer information than other features such as Haar-like features. However their comparisons are between granular intensities or granular gradient orientations, instead of the statistics of gradients within image patches (for example, in a form of HOG). From the relatively successful performance of HOG we can see that the statistics of gradients within image patches are very discriminative for human detection. At the same time, since a granule is usually a pixel or has a square shape, the width and height of a granule are the same, which limits the ability to find useful patterns.

In view of the above, there still needs a method and apparatus capable of obtaining a more discriminative feature with higher computation speed.

Furthermore, there still need a method and apparatus capable of efficiently and accurately detecting object in an image.

[Cited Documents]
1. P. Viola and M. Jones. Rapid object detection using a boosted cascade of simple features. IEEE CVPR, 2001.
2. N. Dalal and B. Triggs. Histograms of oriented gradients for human detection. IEEE CVPR, 2005.
3. Q. Zhu, S. Avidan, M. Yeh, K. Cheng. Fast Human detection using a cascade of histograms of oriented gradients. IEEE CVPR, 2006.
4. G. Duan, C. Huang, H. Ai, and S. Lao. Boosting associated pairing comparison features for pedestrian detection. Ninth IEEE International Workshop on Visual Surveillance, 2009.
5. C. Huang, R. Nevatia. High performance object detection by collaborative learning of joint ranking of granules features. IEEE CVPR, 2010.
6. Y. Freund, R. E. Schapire. A decision-theoretic generalization of on-line learning and an application to boosting. Second European Conference on Computational Learning Theory, 1995.

SUMMARY OF THE INVENTION

The present invention aims to solve the problems as described above. An object of the present invention is to provide a method and apparatus capable of obtaining a more discriminative feature with higher computation speed.

Furthermore, another object of the present invention is to provide a method and apparatus capable of efficiently and accurately obtaining an object classifier for image detection.

Moreover, still another object of the present invention is to provide a method and apparatus capable of efficiently and accurately detecting object in an image.

According to one prospect of the present invention, there provides a method for generating a two-cell structure feature descriptor of a two-cell structure composed of a center cell and a neighbor cell in an image region, wherein the neighbor cell is one of eight cells around and adjacent to the center cell, the method comprising: calculating step for calculating statistics of gradients in the center cell and the neighbor cell respectively; and comparing step for comparing the calculated statistics of gradients in the center cell and the neighbor cell, so as to obtain a two-cell structure feature descriptor for describing the feature of the two-cell structure, and wherein the two-cell structure feature descriptor is one bit binary value.

According to another prospect of the present invention, there provides a method for generating an object classifier for at least one image region, wherein each image region in the at least one image region includes at least one two-cell structures, and each two-cell structure is composed of a center cell and a neighbor cell which is one of eight cells around and adjacent to the center cell, the method comprising: feature space calculating step for calculating a feature space by applying the above described method according to the one prospect of the present invention to each of the at least one two-cell structure included in each of the at least one image region; and generating step for generating the object classifier based on the determined feature space.

According to still another prospect of the present invention, there provides a method for identifying object in an image region, comprising: input step for inputting an image region to be identified; identifying step for identifying whether there exists an object to be identified in the image region by applying the classifier generated by the above described method according to another prospect of the present invention.

According to still another prospect of the present invention, there provides an apparatus for generating a two-cell structure feature descriptor of a two-cell structure composed of a center cell and a neighbor cell in an image region, wherein the neighbor cell is one of eight cells around and adjacent to the center cell, the apparatus comprising: calculating unit configured to calculate statistics of gradients in the center cell and the neighbor cell respectively; and comparing unit configured to compare the calculated statistics of gradients in the center cell and the neighbor cell, so as to obtain a two-cell structure feature descriptor for describing the feature of the two-cell structure, and wherein the two-cell structure feature descriptor is one bit binary value.

According to still another prospect of the present invention, there provides an apparatus for generating an object classifier for at least one image region, wherein each image region in the at least one image region includes at least one two-cell structures, and each two-cell structure is composed of a center cell and a neighbor cell which is one of eight cells around and adjacent to the center cell, the apparatus comprising: feature space calculating unit configured to calculate a feature space by applying the above described apparatus according to the still another prospect of the present invention to each of the at least one two-cell structure included in each of the at least one image region; and generating unit configured to generate the object classifier based on the determined feature space.

According to still another prospect of the present invention, there provides an apparatus for identifying object in an image region, comprising: input unit configured to input an image region to be identified; identifying unit configured to identify whether there exists an object to be identified in the image region by applying the classifier generated by the above described apparatus according to still another prospect of the present invention.

[Advantageous Effect]

By utilizing both the statistics of gradients in a cell space and rich elements therein, the method and apparatus according to the present invention obtains a discrete value with highest discrimination with a higher computation speed, compared with the prior art.

Furthermore, based on such obtained feature, the method and apparatus according to the present invention obtains an object classifier more accurately without reducing efficiency.

Moreover, the present invention can more accurately and efficiently make object detection, such as, human object, for an image.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention. In the figures, similar reference numerals are used for denoting similar items.

FIG. 1A to 1E illustrate some techniques in the prior art. More specifically, wherein FIG. 1A illustrates histogram of oriented gradients in the prior art as described in Document 1, FIG. 1B illustrates overview of the method disclosed in Document 2, FIG. 1C illustrates overview of the method disclosed in Document 3, FIG. 1D illustrates simple pairing comparison of color and gradient orientation in granular space in the prior art, wherein the left portion illustrates pairing comparison of color, and the right portion illustrates pairing comparison of gradient, FIG. 1E illustrates overview of the method disclosed in Documents 4 and 5.

DESCRIPTION OF THE EMBODIMENTS

Embodiments of the present invention will be described in detail below with reference to the drawings.

To more clarify the description, some terms to be used hereinafter will be explained firstly.

A cell in an image region means an image patch included in the image region which may include a plurality of image patches. A cell is composed of at least one pixels, and may be several kinds of shape, such as square, rectangle when it is composed of more than one pixels. The length and width of a cell are expressed in number of pixels, and may the same (for example, square) or different (for example, rectangle).

Figure 1A:
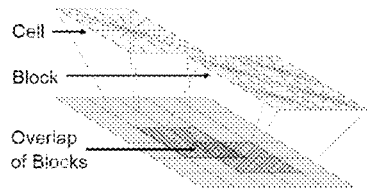
Figure 1B:
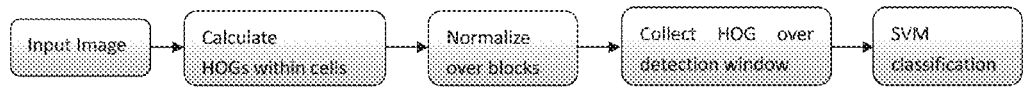
Figure 1C:
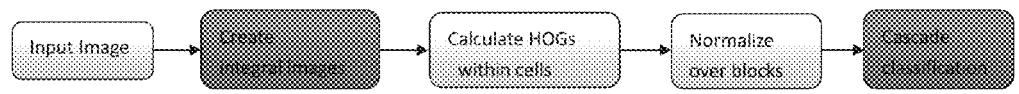
Figure 1D:
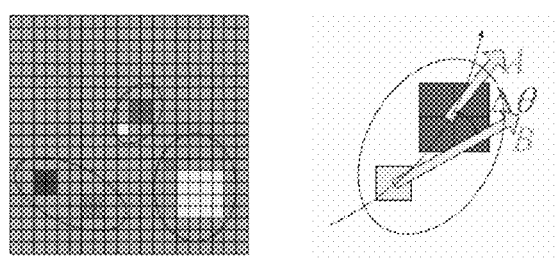
Figure 1E:
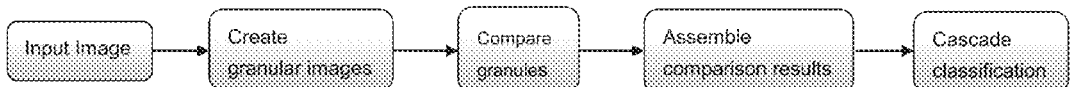
Figure 2:
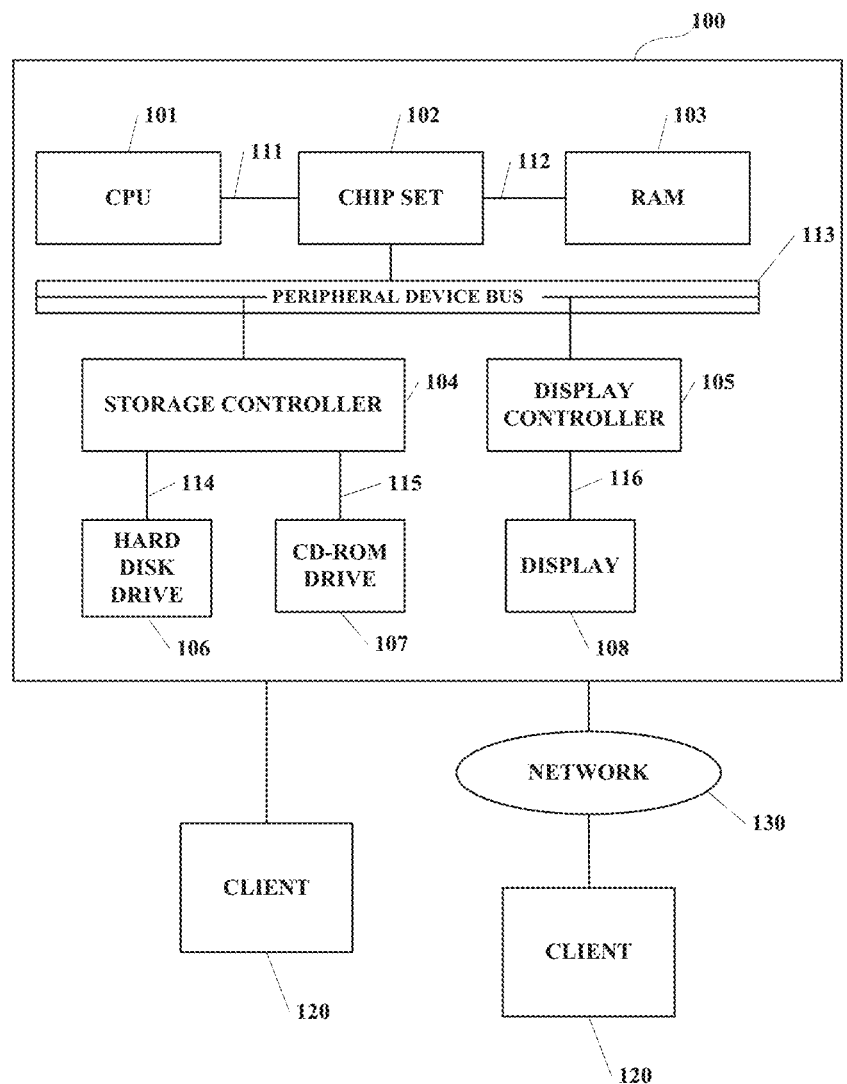
FIG. 2 is a block diagram illustrating an arrangement of a computing device for implementing an apparatus for determining average character width of a character set.

FIG. 2 is a block diagram illustrating the arrangement of a computing device for implementing the apparatus for object classifier generation as well as the apparatus for detecting object in an image according to the present invention. For the sake of simplicity, the apparatus is shown to be built in a single computing device. However, the apparatus is effective regardless of whether the apparatus is built in a single computing device or is built in a plurality of computing devices as a network system.

As shown in FIG. 2, a computing device 100 is used for implementing the process of generating object classifier as well as the process of detecting object in an image. The computing device 100 may comprise a CPU 101, a chip set 102, a RAM 103, a storage controller 104, a display controller 105, a hard disk drive 106, a CD-ROM drive 107, and a display 108. The computing device 100 may also comprise a signal line 111 that is connected between the CPU 101 and the chip set 102, a signal line 112 that is connected between the chip set 102 and the RAM 103, a peripheral device bus 113 that is connected between the chip set 102 and various peripheral devices, a signal line 114 that is connected between the storage controller 104 and the hard disk drive 106, a signal line 115 that is connected between the storage controller 104 and the CD-ROM drive 107, and a signal line 116 that is connected between the display controller 105 and the display 108.

A client 120 may be connected to the computing device 100 directly or via a network 130. The client 120 may, for example, send instructions and/or parameters required by the process of generating object classifier as well as the process of detecting object in an image to the computing device 100, and the computing device 100 may return information to the client 120 or display information on the display 108.

The present invention generally relates to image detection, such as detection of an object in an image region, which is commonly learning-based object detection, and where training and detecting are two main procedures in the above framework. Commonly, a classifier is trained by using a large sample set including positive (having object) and negative (without object) samples. The training is a one-time process. Then in the detecting procedure, the trained classifier is used to determine whether a test image includes an object or not.

In the implementation of the present invention, training and detecting procedures all are performed based on the determination of features of a respective corresponding image region (hereinafter to be referred as LAB HOG feature). The determination of the LAB HOG feature utilizes both the discrimination of HOG and the simplicity of comparison features, and is based on cells included in the image region.

Hereinafter, the respective procedures in the implement of the present invention will be described.

[First Embodiment]

Figure 3A:
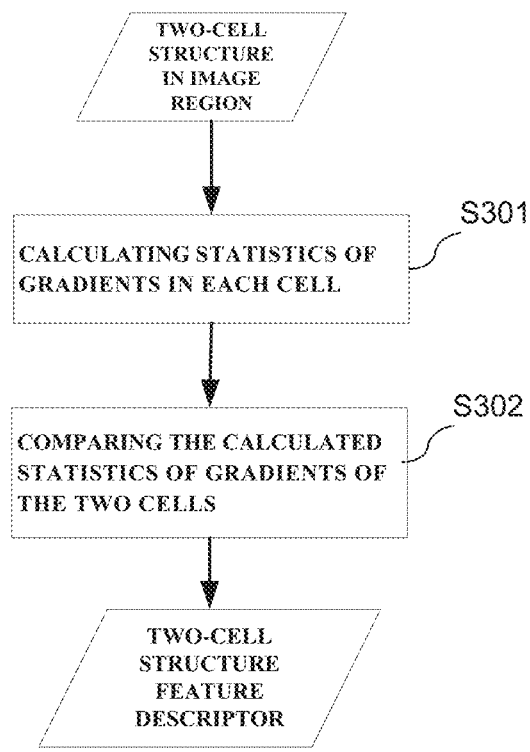
FIG. 3A is a flow chart illustrating the method according to the first embodiment of the present invention.
Figure 3B:
FIG. 3B shows several two-cell structures.

Hereinafter, the method according to the first embodiment of the present invention for determining a two-cell structure feature descriptor in an image region will be described with reference to FIG. 3A and FIG. 3B, where FIG. 3A illustrates the flowchart of the process of the method according to the first embodiment of the present invention, and FIG. 3B shows several exemplary two-cell structure patterns.

In the implementation of the present invention, as a fundamental and inventive process of the determination of LAB HOG feature, a two-cell structure feature descriptor of a two-cell structure composed of a center cell and a neighbor cell in an image region is determined, wherein the neighbor cell is one of eight cells in the image region around and adjacent to the center cell, as shown in FIG. 3B.

Please note that as a common case, the two cells, that is, the center cell and the neighbour cell, may have the same shape and size, that is, length and width of a cell may be the same as that of the other cell. Alternatively, the two cells may have the same width-to-length ratio. Of course, the two cells may have the different width-to-length ratio, which will help to find more discriminative feature.

In step S301 (hereinafter to be referred as calculating step) of the method according to the first embodiment of the present invention, statistics of gradients in the center cell and the neighbor cell are calculated respectively.

In step S302 (hereinafter to be referred as comparing step) of the method according to the first embodiment of the present invention, the calculated statistics of gradients in the center cell and the neighbor cell in the calculating step are compared, so as to obtain a two-cell structure feature descriptor for describing the feature of the two-cell structure.

The statistics of gradients is a value of a bin in the histogram of oriented gradients calculated in a cell, and the result of a comparison is a one-bit binary value. Therefore, the two-cell structure feature descriptor may be represented by a one bit binary value.

More specifically, for a bin, the two-cell structure descriptor will be calculated as follows.

$$\text{Feature} = \begin{cases} 1, & \text{if } Bin_n[dir1] > Bin_c[dir0] \\ 0, & \text{otherwise} \end{cases}$$

Where $Bin_c[dir0]$ and $Bin_n[dir1]$ means the calculated statistics of gradients of a useful bin of the center and neighbor cell respectively, and dir1 and dir0 means the useful bin index of HOG respectively. Please note that dir1 and dir0 usually refer to the same bin.

Actually, since the HOG usually comprises several bins, the comparison between two cells may be performed with respect to each bin and then obtain several one-bit binary values, each corresponding to one bin, and each of the one-bit binary values represents the feature of the two-cell structure. Therefore, all the two-cell structure features constitute a two-cell structure feature space of the two-cell structure.

Figure 4:
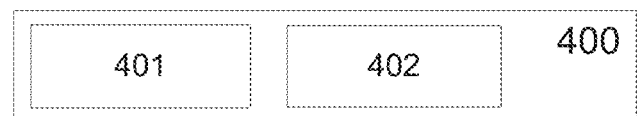
FIG. 4 is a block view illustrating an apparatus according to the first embodiment of the present invention.

FIG. 4 illustrates a apparatus for generating a two-cell structure descriptor of a two-cell structure in an image region according to the first embodiment of the present invention, wherein the two-cell structure is composed of a center cell and a neighbor cell in the image region, wherein the neighbor cell is one of eight cells around and adjacent to the center cell in the image region.

The apparatus 400 may comprises a calculating unit 401 configured to calculate statistics of gradients in the center cell and the neighbor cell respectively, and a comparing unit 402 configured to compare the calculated statistics of gradients in the center cell and the neighbor cell, so as to obtain a two-cell structure feature descriptor for describing the feature of the two-cell structure.

[Good Effect]

Since the method according to the first embodiment of the present invention utilizes both of the discrimination of HOG the simplicity of comparison features, without normalization, the computation speed is improved, the obtained feature would be a discrete value, and the accuracy and discrimination would be improved.

In a prefer implementation, the normalization is not used in the process of the method. However, since the method utilized both of the discrimination of HOG the simplicity of comparison features, the effect of the method would not be substantially influenced adversely even if the normalization is added.

[Second Embodiment]

As described in the above, classifier is substantially essential and is critical for the performance of the image object detection, and the generation of the classifier is also critical for the performance of the image object detection.

The classifier is usually trained by using a large sample set including positive (object) and negative (non-object) samples, each sample may correspond to one image region or one part of an image region. Therefore, the classifier also can be deemed as being trained by using a large set of image regions. The training is a one-time process. There exist many techniques to train a classifier and many kinds of classifier. One common classifier is a cascade structure classifier, and the cascade structure classifier comprises at least one stage and each stage corresponds to a strong classifier composed of a set of weak classifier. Please note that although both of "image" and "image region" is used in the context of the description, they usually may be equivalent to each other, unless stated otherwise.

Figure 5:
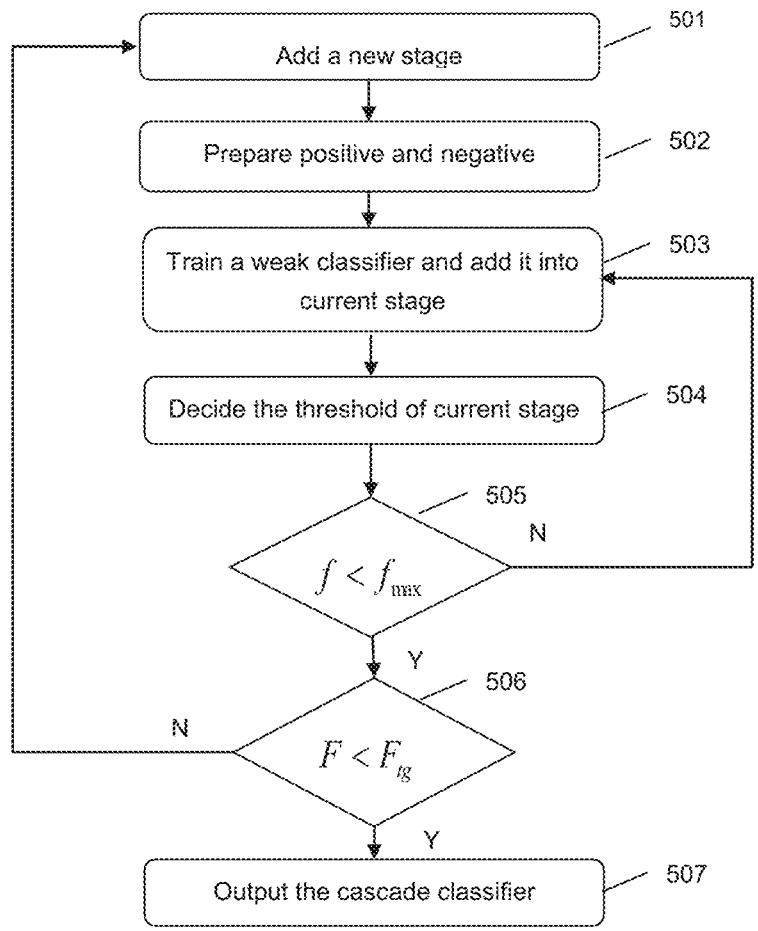
FIG. 5 is a flow chart illustrating a training process.

Hereinafter an overview of training process of a classifier will be described with reference to FIG. 5, which illustrates training of a stage of a cascade classifier. In the training procedure a cascade structure classifier is trained by Adaboost. Adaboost provides an effective learning process and strong bounds on generalized performance. For each stage of the cascade, a strong classifier composed of a set of weak classifiers is constructed. During the construction of the strong classifier, weak classifiers are continuously added until a predetermined quality metric is met. The quality metric is in the terms of a detection rate and a false positive rate.

In step 501, a new stage is added into the cascade classifier.

In Step 502, positive and negative samples (for example, at least one image region, usually, a plurality of image regions) for the training of the coming new stage are prepared. A training schema called bootstrap, which is well known in the art, is applied for negative samples collecting. A set of non-object images are regarded as the source of the negative samples. After the training procedure of each stage, the cascade classifier is evaluated over the whole image set, and any positive predicts, which are considered as false positives ("FPs"), are collected to form the negative training set to train the next stage strong classifier. Please note that the positive and negative samples usually are not varied during the process for the stage, and the number of positive and negative samples in a stage is usually different from that in another stage.

Figure 6:
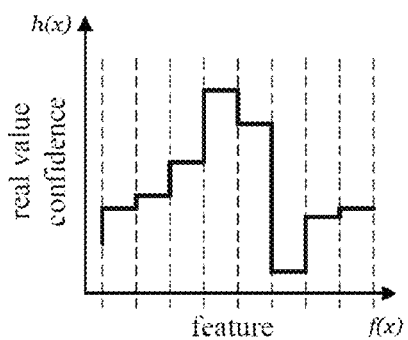
FIG. 6 shows an LUT weak classifier.

In step 503, a weak classifier is trained based on a feature space of the training images. One common type of weak classifier is a Look-Up-Table (LUT) type weak classifier, and the LUT weak classifier is a piece-wise function which divides the feature space into several bins and output a constant value for each bin as shown in FIG. 6. The abscissa f(x) represents the bin in the feature space and the ordinate h(x) represents real value confidence. The sign of h(x) gives the classification and |h(x)| a measure of the "confidence" in prediction.

In step 504, the threshold of this stage is decided. More specifically, an initial value is set and then decreased until the target detection rate $d_{min}$ is met. Then, the latest value is set as the threshold T and the false positive rate f under this threshold in current stage is evaluated.

In step 505, the evaluated false positive rate f is compared with the maximum acceptable false positive rate per stage $f_{max}$. If f is less than $f_{max}$, the training of current stage will be accomplished, otherwise, another weak classifier is to be added into this stage, that is, the process in steps S503 to S504 is repeated until the false positive rate f in current stage is less then $f_{max}$.

In step 506, when the training of current stage is accomplished, we compare the whole false positive rate F of current cascade classifier with the target false positive rate $F_{tg}$. If F is less than $F_{tg}$, the whole training procedure is accomplished, otherwise, a new stage is to be added into the cascade classifier. Then the processes in steps S502 to S505 are repeated, until F is less than $F_{tg}$. When the whole training procedure is accomplished, a strong classifier in this stage is obtained.

Finally, all the previously trained stage strong classifiers constitute the final cascade classifier and the cascade classifier is output for future use, in step 507.

During the training of a weak classifier, the feature space from at least one training image serves as a basis of the training and thus is critical for the performance of the weak classifier as well as the final cascade classifier. More specifically, the accuracy and efficiency of obtaining of the feature space is important for the accuracy and efficiency of training of a weak classifier.

In the present invention, there provides a method according to the second embodiment of the present invention for the training of a weak classifier, which utilizes a method according to the first embodiment of the present invention so that the feature space is accurately and efficiently obtained. More specifically, in the implementation of the present invention, each of the at least one training image is divided into a plurality of cells and thus at least one two-cell structures are obtained. Then, the method according to the first embodiment of the present invention is applied to each two-cell structure so that a two-cell structure feature space for the at least one training image is obtained. Based on the feature space, a corresponding object classifier (weak classifier) is obtained, and based on the similar process, at least one weak classifier required for a stage can be obtained so as to form a strong classifier for the current stage in the cascade classifier, and thus the final cascade classifier with at least one stage can be formed by at least one strong classifier in each stage.

Hereinafter, the classifier generation method according to the second embodiment of the present invention will be described with reference to FIG. 7.

Figure 7:
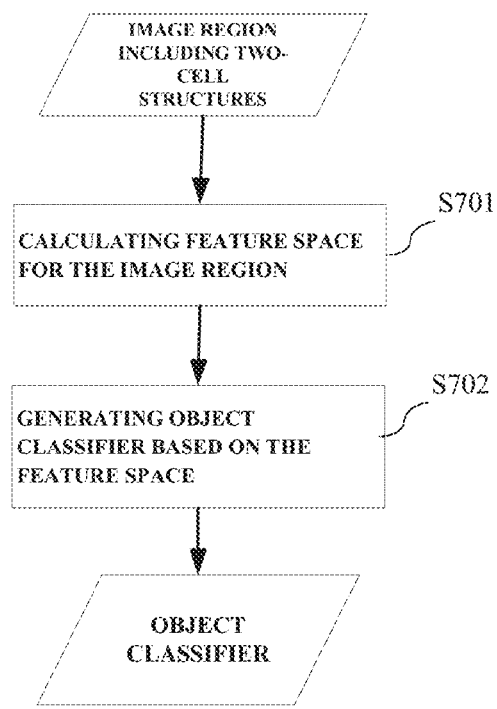
FIG. 7 is a flow chart illustrating the method according to the second embodiment of the present invention.

FIG. 7 is a flow chart illustrating a method for generating an object classifier for at least one image region used for training, wherein each image region includes at least one two-cell structures, and each two-cell structure is composed of a center cell and a neighbor cell which is one of eight cells around and adjacent to the center cell.

In step S701 of the method (hereinafter to be referred to as feature space calculating step), the feature space for the at least one image region is calculated by applying the method according to the first embodiment of the present invention to each of the at least one two-cell structure included in the at least one image region used for training. The feature space is composed of a plurality of two-cell structure feature descriptors obtained from the at least one two-cell structure included in the image region.

Figure 10A:
FIG. 10A shows several exemplary two-cell structures and FIG. 10B shows several exemplary three-cell structures.

The at least one two-cell structures usually constitute a two-cell structure space which is obtained by enumerating all two-cell structures, as shown in FIG. 10A.

As described above, a two-cell structure feature descriptor is obtained by comparing statistics of gradients in the center cell and the neighbor cell. The statistics of gradients in each cell is the value of one bin of the histogram of oriented gradients (HOG) in this cell. This bin will be called the useful bin therein, a vector: [w, h, x0, y0, dir0, x1, y1, dir1] is defined for a 2-cell structure as its attribute information.

Where, w and h in this vector represent width and height of a cell respectively. The information of center cell is defined by x0, y0 and dir0 which is x-coordinate, y-coordinate of left top pixel and the useful bin index of HOG respectively. The information of neighbor cell is defined by x1, y1, dir1 in a same manner.

Although in the above expression, only one w and one h is used to represent the width an height of each cell in a two-cell structure, which means that the width and length of a cell may be the same as that of the other cell, it is only an example, and the width and length of a cell may be different from that of the other cell.

In step S702 (hereinafter to be referred to as generating step) the object classifier is generated based on the calculated feature space. The manner of generation the object classifier from the specific-cell structure is not specifically limited, and may be any common method in the art.

Since in the process of the method according the second embodiment, the feature space of a training image is obtained by utilizing the method according to the first embodiment of the present and used for generation of an object classifier, the method according to the second embodiment of the present invention can accurately and efficiently obtain a more discriminative feature space, thereby the performance of the obtained classifier is improved, irrespective of the manner of generation the object classifier from the feature space.

Conventionally, in the implementation of the generation the object classifier from the feature space, an exhaustive search method is used for the whole obtain feature space, such as Haar-like features or HOG features, to find representative feature structure for the weak classifier, which may have high computation overhead and slow.

Due to the possible different cell positions, cell sizes and cell structures, the complexity of the LAB HOG feature space is combinatorial. Therefore the conventional exhaustive search method used for Haar-like features or HOG features cannot effectively applicable. Therefore, to further improve generation of an object classifier from a feature space, the method according to the second embodiment of the present invention preferably employs a heuristic search procedure to efficiently select at least one proper feature for the training of a weak classifier in each round of Adaboost algorithm, thereby obtain the weak object classifier.

In the implementation of the second embodiment, the generating step further comprises a determining step for determining at least one specific-cell structure feature for at least one image region based on the calculated feature space thereof using heuristic algorithm, wherein each specific-cell structure feature is a N-bit binary value, N corresponding to the number of two-cell structure feature descriptor constituting the specific-cell structure feature and the value of each bit in the N-bit binary value corresponding to one of N two-cell structure feature descriptors included in the specific cell structure, wherein N is larger than or equal to 1. The determined at least one specific-cell structure feature is used to generate the object classifier. Please note that an object classifier (weak classifier) in the second embodiment according to the present invention can be composed of one or more specific-cell structure feature.

A specific cell structure feature may correspond to a specific cell structure, and in this case, N may correspond to the number of two-cell structure feature constituting the specific-cell structure, and the value of each bit in the N-bit binary value corresponds to one of two-cell structures included in the specific cell structure.

Please note that as described above, a specific-cell structure feature of image region can be obtained by directly assembling two-cell structure feature descriptors included in the feature space of the image region, and also can obtained by firstly assembling the two-cell structures in the image region to obtain a specific-cell structure and then calculating the feature of specific-cell structure. Both of them are equivalent.

In an example, a specific cell structure for an image region can be obtained by assembling several two-cell structures in the image region. In an instance, a specific cell structure of an image region may be composed of two three-cell structures, and each of the two three-cell structures may be composed of two two-cell structures having the same center cell. The center cells of the two three-cell structures may be the same or different. In this case, the feature of the specific cell structure will be a four-bit binary value.

Furthermore, the width-to-height ratios of cells in a three-cell structure may be the same, but may be various values which help to find more discriminative patterns.

Figure 8:
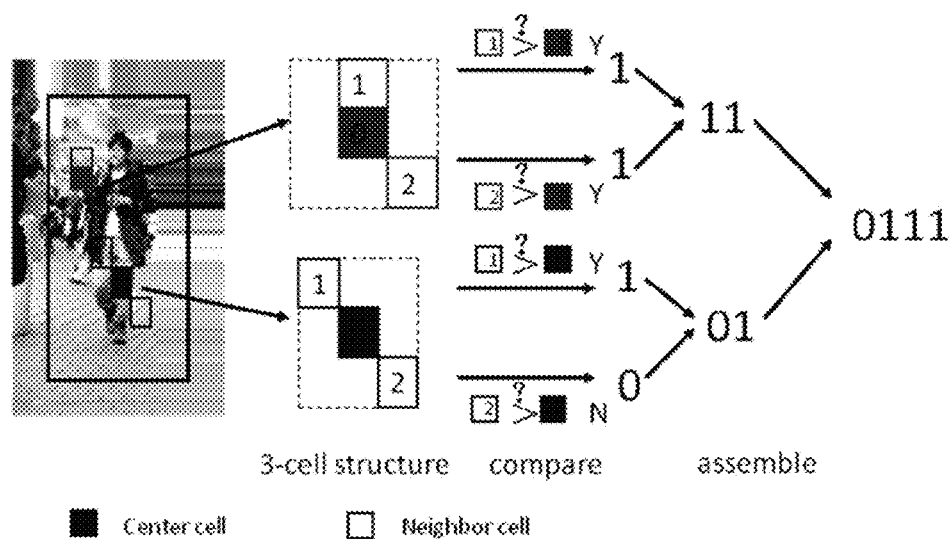
FIG. 8 shows an example of the feature obtained by the method according to the second embodiment of the present invention.

An example of the determined specific cell structure of an image region is shown in FIG. 8, and the generation of the feature of the determined specific cell structure may be summarized as follows. The statistics of gradients between neighbor cell and center cell in each of two three-cell structures are compared firstly. Then binary comparison results of two three-cell structures are assembled to form a 4-bit LAB HOG feature as the specific cell structure feature.

Please note that FIG. 8 is only a simplified example so as to make the concept of the present invention clear, not limiting the specific implementation of the method of the present invention. The specific cell structure feature can be in any other form.

Figure 9:
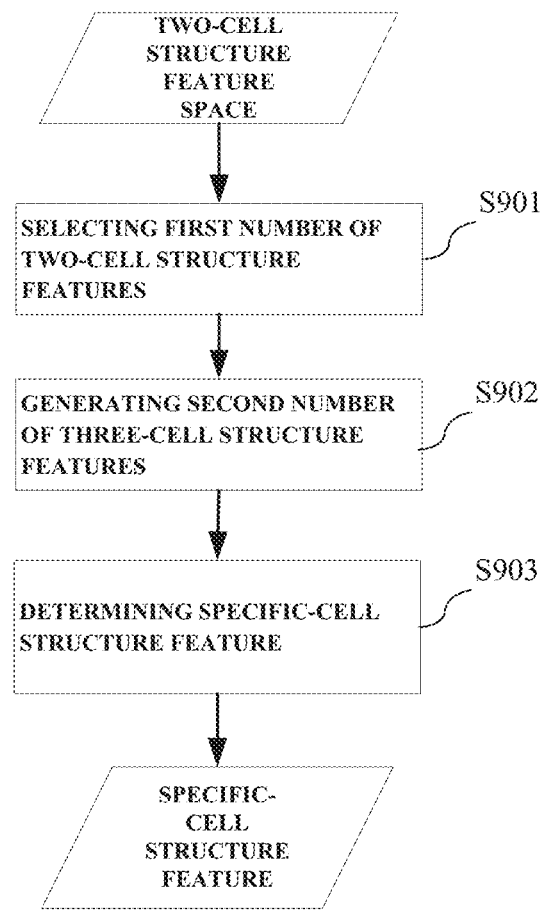
FIG. 9 is flow chart illustrating process in the determining step in the method according to the second embodiment of the present invention.

Hereinafter, the processes of the determining step with N=4 will be described in detail with reference to FIG. 9.

In step S901 (hereinafter to be referred as two-cell structure feature selecting step), a first number of two-cell structure feature descriptors with low training error are selected from the calculated feature space.

In step S902 (hereinafter to be referred as three-cell structure feature generating step) for generating a second number of three-cell structure features with low training error from the selected first number of two-cell structure feature descriptors; and In step S903 (hereinafter to be referred to as specific cell structure feature determining step) for determining the specific-cell structure feature based on the second number of three-cell structure features.

Hereinafter, process in each step will be described in detail.

In the process of two-cell structure feature selecting step (S901), the two-cell structure feature descriptors constituting the feature space are sorted in ascending order according to an specific error index, and the top N1 number (first number) of features are selected as good features with low training error. Since as described above, one two-cell structure may correspond to several features depending on the number of bins in HOG, the first number of features selected will correspond to several two-cell structures.

The specific error index is determined with respect to the feature space, and its generation manner usually relates to the type of the classifier to be generated. In the LUT classifier case, the error index is a normalization factor calculated corresponding to the LUT classifier.

The calculation of the normalization factor will be described below.

In the implementation of the present invention, a LUT weak classifier is built for each feature in the feature space. The feature spaces of 2-cell, 3-cell and LAB HOG feature are divided into 2, 4 and 16 bins respectively.

If current samples are $(x_1, y_1), \ldots, (x_m, y_m)$ where $y_i = -1, 1$ for negative and positive respectively, $w_{t,i}$ is the weight of sample $x_i$ where t indicates the weak classifier index in current stage and the bin number of LUT is n, the build step can be illustrated as follows:

For each bin, the sum of the weight of positive and negative samples which belong to this bin respectively is calculated as follows.

$$W_l^j = \sum_{i: f(x_i) = j \wedge y_i = l} w_{t,i}$$

where $l = \pm 1$ and $j = 0, \ldots, n$
The output of h(x) on bin j is set as $$h(x) = \frac{1}{2} \ln\left(\frac{W_{+1}^j + \varepsilon}{W_{-1}^j + \varepsilon}\right)$$

where $\varepsilon$ is a small positive constant
Then, the normalization factor is calculated as $$Z = 2 \sum_j \sqrt{W_{+1}^j W_{-1}^j}.$$

Therefore, the two-cell structure feature descriptors are sort in ascending order according to normalization factor Z and select the top N1 features as good features.

In the process of three-cell structure feature generating step (S902), a three-cell structure feature calculating step may be performed to calculate a three-cell structure feature from two two-cell structure feature descriptors in the selected first number of two-cell structure feature descriptors, the two two-cell structure feature descriptors respectively corresponding two two-cell structures different from each other with the same center cell and different neighbor cell, so as to obtain a plurality of three-cell structure features, wherein each of the plurality of three-cell structure features is a two-bit binary value, each bit corresponding to a two-cell structure feature descriptor used for calculating the three-cell structure feature. Then, the second number of three-cell structure features with low training error are selected from the plurality of three-cell structure features.

Figure 10B:
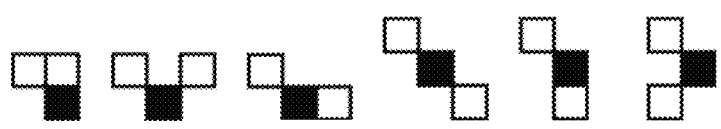

Since as described above, one two-cell structure may correspond to several feature descriptors depending on the number of bins in HOG, one two-cell structure feature descriptor corresponds to one two-cell structure, and thus the combination of two two-cell structure feature descriptors actually may be equivalent to combination of two two-cell structures, and the generated three-cell structure feature may correspond to a three-cell structure. Some typical thee-cell structure patterns are shown in FIG. 10B.

Therefore, the three-cell structure feature calculating step may be interpreted as including a two-cell structure combining step and a three-cell structure feature combining step, wherein two-cell structure combining step aims to generate a three-cell structure, from two-cell structures corresponding to the first number of two-cell structure features, by combining a basic two-cell structure and an additional two-cell structure composed of the center cell of the basic two-cell structure and an additional neighbor cell, the additional neighbour cell is one of eight cells around and adjacent to the center cell in the image region and is distinct from the neighbor cell in the basic two-cell structure, and the three-cell structure feature combining step combines, for each combined three-cell structure, combing each of the two-cell structure descriptors of the basic two-cell structure and each of the two-cell structure descriptors of the addition two-cell structure included in the combined three-cell structure to obtain three-cell structure features, wherein each of the plurality of three-cell structure features is a two-bit binary value, each bit corresponding to a two-cell structure descriptor of one of the basic two-cell structure and a additional two-cell structure included in the combined three-cell structure.

Specifically, a three-cell structure is obtained by combing two two-cell structures with the same center cell and different cell, one serving as a basic two-cell structure and the other serving as an additional two-cell structure, and the two two-cell structures usually may be different from each other, and is defined by a vector: [w, h, x0, y0, dir0, x1, y1, dir1, x2, y2, dir2], the meaning of the similar symbols therein is similar to that for the 2-cell structure described above, wherein he information, that is, x-coordinate, y-coordinate of left top pixel and the useful bin index of HOG respectively, of the neighbor cell in the additional two-cell structure is defined by x2, y2 and dir2.

Although in the above expression, only one w and one h is used to represent the width an height of each cell in a three-cell structure, which means that all the width and length of the three cells may be the same, it is only an example, and the width and length of three cell may be different from each other.

Each three-cell feature is a two-bit value calculated by combining the two one-bit binary value of the two two-cell structure include in the three-cell structure. Detail calculation is illustrated as follows:

$$bit1 = \begin{cases} 1, & \text{if } Bin_n[dir1] > Bin_c[dir0] \\ 0, & \text{otherwise} \end{cases}$$

$$bit2 = \begin{cases} 1, & \text{if } Bin_n[dir2] > Bin_c[dir0] \\ 0, & \text{otherwise} \end{cases}$$

Feature = $bit2\ bit1$

Where, bit1 and bite2 represent a one-bit binary value of one of the two-cell structure respectively.

All the thee-cell features can constitute a three-cell feature space. Please note that two two-cell features constructing a three-cell feature usually may be in the same image region, which means that two different two-cell feature structures constructing a three-cell feature structure may also be in the same image region.

Then, all the three-cell structure features are sorted in ascending order according to an error index and the top N2 (second number) features are selected as good features with low training error. Please note that the index therein may be calculated in a similar manner with that of index for the selecting a first number of two-cell structure feature descriptors, except this index is calculated with respect to the three-cell feature space.

For example, the error index may be a normalization factor Z which is calculated as described above with respect to the three-cell feature space. Therefore, the three-cell features are sorted in ascending order according to normalization factor Z and select the top N2 features as good features.

Please note that such interpretation for three-cell structure feature calculating step only aims to clarify one manner of the implementation of three-cell structure feature calculating step, and the implementation of three-cell structure feature calculating step is not so limited.

In the process of specific cell structure feature determining step (S903), a three-cell structure feature combining step and a select step may be performed, wherein the three-cell structure feature combining step combines any two three-cell structure feature included in the second number of three-cell structure features to obtain a plurality of combined cell structure features, wherein the feature of one combined cell structure feature is a four-bit binary value, each bit corresponding to the two-cell structure feature descriptor of one of the two two-cell structure feature descriptors included in one of the corresponding two three-cell structure feature, and the selecting step selects a combined cell structure feature with lowest training error from the plurality of combined cell structures as the specific-cell structure feature. The combined two three-cell structure features may not correspond to the same three-cell structure. Of course, they may correspond to the same three-cell structure.

More specifically, two of above second number of good three-cell features are combined, and then each LAB HOG feature is a 4-bit value calculated as follows:

$$bit1 = \begin{cases} 1, & \text{if } Bin_n^1[dir1] > Bin_c^1[dir0] \\ 0, & \text{otherwise} \end{cases}$$

$$bit2 = \begin{cases} 1, & \text{if } Bin_n^1[dir2] > Bin_c^1[dir0] \\ 0, & \text{otherwise} \end{cases}$$

$$bit3 = \begin{cases} 1, & \text{if } Bin_n^2[dir1] > Bin_c^2[dir0] \\ 0, & \text{otherwise} \end{cases}$$

$$bit4 = \begin{cases} 1, & \text{if } Bin_n^2[dir2] > Bin_c^2[dir0] \\ 0, & \text{otherwise} \end{cases}$$

Feature = $bit4\ bit3\ bit2\ bit1$

Where the $Bin^1$ and $Bin^2$ refer to two three-cell features respectively. All the LAB HOG features constitute a LAB HOG feature space.

The, the LAB HOG feature which has a lowest error index is selected and the corresponding classifier (such as LUT classifier) is selected as the obtained weak classifier.

Similarly, one three-cell structure may correspond to several three-cell structure feature depending on the number of bins in HOG, and thus the combination of two three-cell structure feature descriptors actually may be equivalent to combination of two three-cell structures corresponding to the two three-cell structure features respectively, so as to obtain a specific-cell structure corresponding to the specific-cell structure feature.

Please note that two three-cell features constructing a specific-cell feature may usually be in the same image region, which means that two different three-cell feature structures constructing a specific-cell feature structure may also be in the same image region.

Please note that the specific error index therein may be calculated in a similar manner with that of index for the selecting a first number of two-cell structure feature descriptors, except this index is calculated with respect to the three-cell feature space.

For example, the error index may be a LAB HOG feature normalization factor Z which is calculated as described above with respect to the LAB HOG feature space. Therefore, the LAB HOG features are sorted in ascending order according to normalization factor Z and the feature with the lowest normalization factor is selected as the specific-cell structure feature.

As the attribute information of the foregoing two-cell structure and three-cell structure, the obtained specific-cell structure corresponding to the specific-cell structure also comprises attribute information, which may be in a vector form or other form, comprise information on two-cell structures included in the specific-cell structure, and the information on of a two-cell structure is the three-cell structure including the two-cell structure, the position information of the cells included in the two-cell structure, and the information on the bin of the cells included in the two-cell structure in which the histogram of oriented gradients is calculated.

Please note that the cells included in the specific-cell structure may have the same or different width-to-length ratio, and the two three-cell structures used for combination may have the same or different center cell.

Furthermore, If $h_t(x)$ is the learned weak classifier, the weights of positive and negative samples are updated as follows:

$$w_{t+1,i} = w_{t,i} \exp(-y_i h_t(x_i))$$

$w_{t+1,i}$, $w_{t,i}$ is the weight of sample $x_i$ after and before update respectively. Such updating will give misclassified examples more weight, and the updated weights will be used for the next stage training.

Although a weak classifier included in one stage of a cascade classifier is described above and obtained by the method according to the second embodiment of the present invention, it is only a example, and the method according to the second embodiment of the present invention also can be applied to generate other type of classifier.

Figure 11:
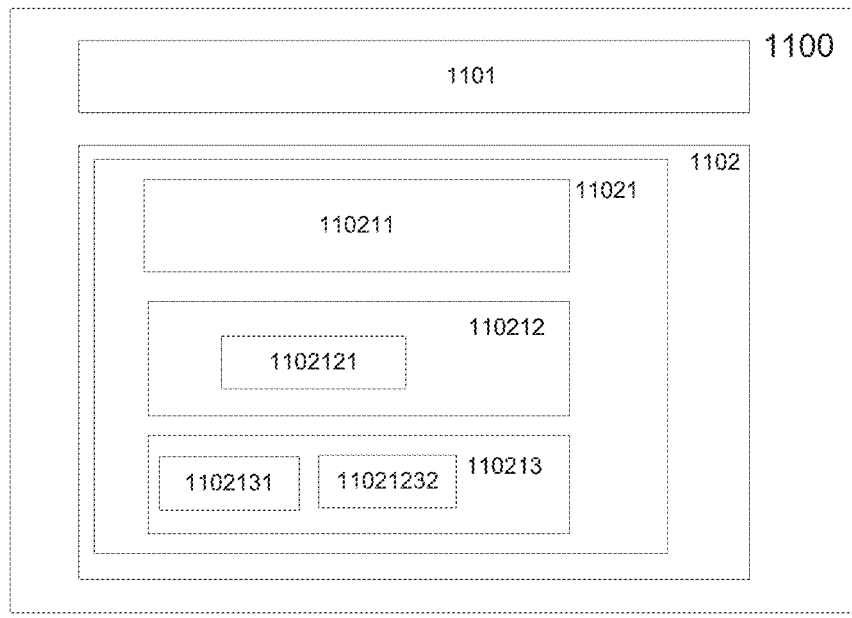
FIG. 11 shows a block view illustrating an apparatus according to the second embodiment of the present invention.

FIG. 11 is a block view illustrating the apparatus for generating an object classifier for an image region according to the second embodiment of the present invention, wherein the image region includes at least one two-cell structures, and each two-cell structure is composed of a center cell and a neighbor cell which is one of eight cells around and adjacent to the center cell in the image region.

The apparatus 1100 may comprises a feature space calculating unit 1101 configured to calculate the feature space for the image region by applying the method according to the first embodiment of the present invention to each of the at least one two-cell structure included in the image region, and a generating unit 1102 configured to generate the object classifier based on the determined feature space.

Preferably, the generating unit 1102 may comprises a determining unit 11021 configured to determine a specific-cell structure feature of the image region based on the calculated feature space using a heuristic algorithm, wherein the specific-cell structure feature corresponds to a specific-cell structure which is obtained from the at least one two-cell structures and is a N-bit binary values, the value of each bit corresponding to a two-cell structure feature descriptor of one two-cell structure included in the specific cell structure, wherein the object classifier is generated from the specific-cell structure feature; and wherein N is larger than or equal to 1.

Preferably, the determining unit 11021 may comprises a two-cell structure feature selecting unit 110211 configured to select a first number of two-cell structure feature descriptors with low training error from the calculated feature space; a three-cell structure feature generating unit 110212 configured to generate a second number of three-cell structure features with low training error from the selected first number of two-cell structure features; and a specific cell structure feature determining unit 110213 configured to determine the specific-cell structure feature based on the second number of three-cell structure features.

Preferably, the three-cell structure feature generating unit 110212 may further comprise a unit 1102121 configured to calculate a three-cell structure feature from two two-cell structure feature descriptors in the selected first number of two-cell structure feature descriptors, the two two-cell structure feature descriptors respectively corresponding different two two-cell structures with the same center cell and different neighbor cell, so as to obtain a plurality of three-cell structure features, wherein each of the plurality of three-cell structure features is a two-bit binary value, each bit corresponding to a two-cell structure feature descriptor used for calculating the three-cell structure feature, and wherein the second number of three-cell structure features with low training error are selected from the plurality of three-cell structure features.

Preferably, the specific-cell structure feature determining unit 110213 may further comprise a three-cell structure feature combining unit 1102131 configured to combine any two three-cell structure feature which do not correspond to the same three-cell structure included in the second number of three-cell structure features to obtain a plurality of combined cell structure features, wherein the feature of one combined cell structure feature is a four-bit binary value, each bit corresponding to the two-cell structure feature descriptor of one of the two two-cell structure feature descriptors included in one of the corresponding two three-cell structure feature, and a selecting unit 1102132 configured to select a combined cell structure feature with lowest training error from the plurality of combined cell structures as the specific-cell structure feature.

[Good Effect]

Since the method according to the second embodiment of the present invention utilizes the method according to the first embodiment of the present invention to determine the feature descriptor of a two-cell structure and thereby obtain a final specific-cell structure feature, therefore, the method according to the second embodiment of the present invention actually utilizes both of discrimination of HOG and simplicity of comparison features, the computation speed and discrimination of the obtained feature will be improved.

Furthermore, the method according to the second embodiment of the present employs a heuristic search procedure, instead of an exhaustive search method commonly used for Haar-like features or HOG features, to efficiently select a proper feature for the training of a weak classifier.

[Third Embodiment]

As described above, Training and detecting are two main procedures in the detection of object in an image. On the premise that a classifier has been obtained, the classifier will be used to detect the object in the image.

A common implementation of the detecting procedure for an input image will be described. The input image is scaled to seek object of different sizes. Then, each scaled image from the top left to the bottom right are scanned with rectangular sliding windows, and each sliding window is classified as object or non-object using the trained classifier. The classification is usually performed stage by stage, and thus the detection is also usually performed stage by stage. When the sliding window is classified (detected) as object in a stage, the classification will be terminated, otherwise, the sliding window will be classified (detected) in next stage, until the sliding window is classified as object.

Figure 12:
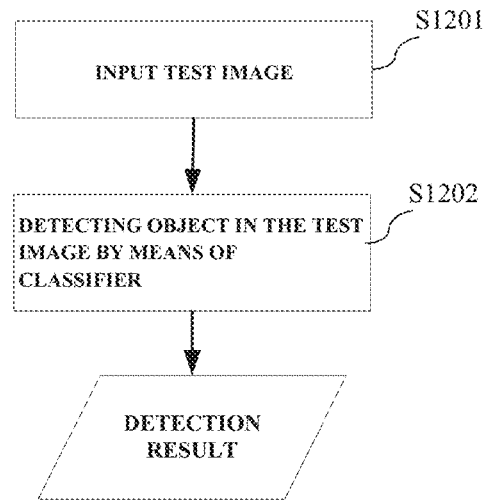
FIG. 12 is a flow chart illustrating the method according to the third embodiment of the present invention.

Hereinafter the method for detecting object in an image region according to the third embodiment of the present invention will be described with reference to FIG. 12. Please note that such method usually corresponds to a process for a stage.

In step S1201 (hereinafter to be referred to as input step), an image region to be detected is input.

In step S1202 (hereinafter to be referred as detecting step), it is detected whether there exists an object to be identified in the image region by applying the classifier generated by the method according to the second embodiment of the present invention.

Please note such detection is usually based on a strong classifier in a stage which is composed by at least one weak classifier, and the weak classifier may be obtained by the method according to the second embodiment of the present invention. That is, the term "classifier" hereinafter sometimes may mean a strong classifier composed of a set of weak classifiers, and the description hereinafter is based on such basis.

Figure 13:
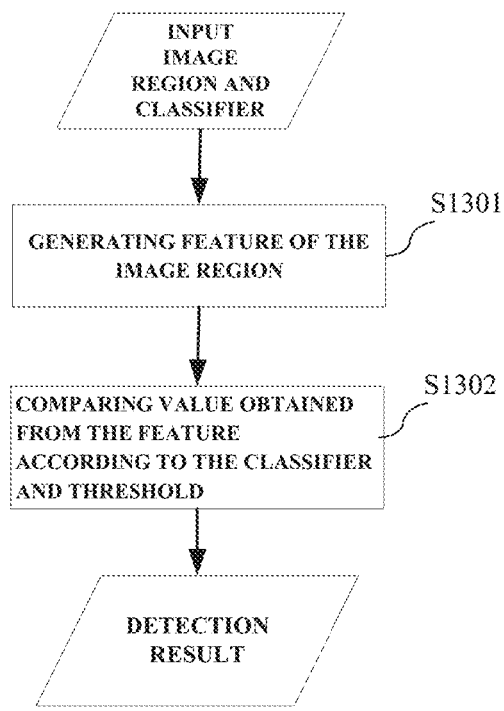
FIG. 13 is a flow chart illustrating the process in the identifying step.

The detection based on a classifier may be implemented in any manner well known in the prior art. Hereinafter the process in S1202 will be described in detail with reference to FIG. 13, and the process is described based on LUT classifier. Please note that the process hereinafter is only an example, not intended to limit.

In step S1301 (hereinafter to be referred as feature obtaining step) a feature of the image region to be identified is obtained according to the generated classifier.

In particular, the process of feature obtaining step (S1301) may determine the specific-cell structure in the image region to be identified corresponding to the object classifier with reference to attribute information thereof and obtain the feature of the specific-cell structure as the feature of the image region, wherein, the attribute information of the object classifier is information on two-cell structures included a cell structure corresponding to the object classifier, the information on a two-cell structure comprising combination information of the two-cell structure, the position information of the cells included in the two-cell structure, and the information on the bin of the cells included in the two-cell structure in which the histogram of oriented gradients is calculated. Generally, the position information may comprise coordinates of the upper left corner of the cell.

More specifically, according to the information corresponding to the classifier, the specific-cell structure in the image to be identified corresponding to the cell-structure of the classifier as well as information of each two-cell structure therein is determined, the information may includes the combination sequence of the two-cell structure as well as its position and related bin.

Based on such information, the feature of the image region to be identified can be calculated rapidly via integral images in both PC system and embedding system.

Firstly, the statistics of gradients between two cells included in each two-cell structure are compared to obtain two-cell structure features, and each comparison gives a binary result.

Secondly, according to the combination the sequence, the two-cell structure features are combined into three-cell structure feature and thereby obtain the feature of the specific-cell structure as the feature of the image region to be identified, which is a 4-bit LAB HOG value.

In step S1302 (hereinafter to be referred as comparing step), the feature is further processed according to the classifier and the value obtained thereby is compared with a corresponding threshold by the classifier so as to identify whether there exists an image to be identified in the image region.

More specifically, according to the LUT of each weak classifier, we can further process the calculated LAB HOG feature so as to obtain a corresponding real value confidence as corresponding output of the weak classifier. Then we accumulated those outputs of weak classifiers in current stage, and then form the output of the stage strong classifier. Please note that the process can be similarly implemented for any other type of classifier, that is, for any other kind of classifier, the calculated LAB HOG feature would be further processed according the classifier to obtain a value corresponding to the type of the classifier, and then value of each of at least one weak classifier would be combined to obtain an output value of a stage We compare the output value of a strong classifier in the stage with the threshold T of the strong classifier calculated in step 504. If the output is less than the threshold T, the cascade classifier will classify the input sub-window as non-human and reject it, or will pass the sub-windows to next stage.

Figure 14:
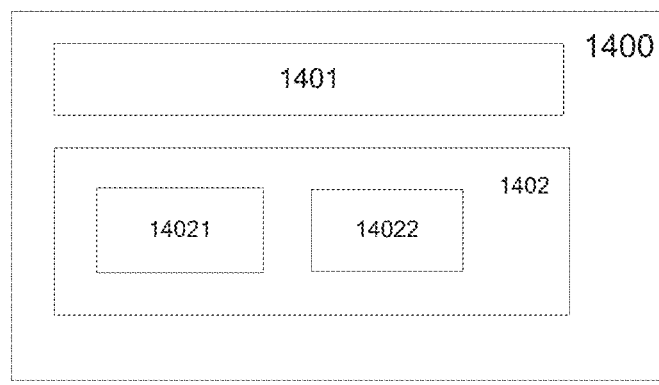
FIG. 14 is a block view illustrating an apparatus according to the third embodiment of the present invention.

FIG. 14 is a block view illustrating the apparatus for identify object in an image region according to the second embodiment of the present invention.

The apparatus 1400 may comprise an input unit 1401 configured to input an image region to be identified, and an identifying unit 1402 configured to identify whether there exists an object to be identified in the image region by applying the classifier generated by the method according to the second embodiment of the present invention.

Preferably, the identifying unit 1402 may comprise a feature obtaining unit 14021 configured to obtain a feature of the image region to be identified according to the generated classifier; and a comparing unit 14022 configured to compare value obtained by processing the feature according to the classifier with a corresponding threshold so as to identify whether there exists an image to be identified in the image region.

Preferably, the feature obtaining unit 14021 may be further configured to determine a specific-cell structure in the image region to be identified corresponding to the object classifier with reference to attribute information thereof and obtain the feature of the specific-cell structure as the feature of the image region, wherein the attribute information of the object classifier is information on two-cell structures included a cell structure corresponding to the object classifier, the information on a two-cell structure comprising combination information of the two-cell structure, the position information of the cells included in the two-cell structure, and the information on the bin of the cells included in the two-cell structure in which the histogram of oriented gradients is calculated.

[Good Effects]

The above methods in the prior art and the method in the present invention are summarized in table 1. The accuracy and the efficiency of those methods are based on the results reported in their papers.

TABLE 1

Method comparison

| Method | feature | learning | accuracy | efficiency |
|---|---|---|---|---|
| Document 2 | HOG | SVM | High | Low |
| Document 3 | HOG | Adaboost | No obvious improvement | Improved |
| Document 4 | APCF | Adaboost | Improved | No obvious improvement |
| Document 5 | JROG | Adaboost | No obvious improvement | Improved |
| Our | LAB HOG | Adaboost | Improved | No obvious improvement |

The features mentioned before are summarized in table 2.

TABLE 2

Feature comparison

| Feature | form | discrimination | Computation speed |
|---|---|---|---|
| HOG | Vector | High, due to the statistics of gradients | Low, the normalization step significantly increases the computation cost especially for the embedding system |
| Joint HOG | Continuous value | High, due to the statistics of gradients | High, few division operations during the normalization step |
| APCF/ JROG | Discrete value | Higher, due to rich elements in the granular space | Higher, no normalization step is required |
| Our LAB HOG | Discrete value | Highest, utilize both the statistics of gradients and rich elements in the cell space | Higher, no normalization step is required |

In addition, it is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a per son skilled in the art that the above embodiments can be modified without departing from the scope and spirit of the present invention. The scope of the present invention is defined by the attached claims.

What is claimed is:

1. A method for generating an object classifier for at least one image region, wherein each image region in the at least one image region includes at least one two-cell structures, and each two-cell structure is composed of a center cell and a neighbor cell which is one of eight cells around and adjacent to the center cell, the method comprising:

feature space calculating step for calculating a feature space by applying a descriptor generation method for generating a two-cell structure feature descriptor for each of the at least one two-cell structure included in each of the at least one image region; and generating step for generating the object classifier based on the determined feature space, wherein the descriptor generation method comprises:

calculating step for calculating statistics of gradients in the center cell and the neighbor cell respectively; and comparing step for comparing the calculated statistics of gradients in the center cell and the neighbor cell, so as to obtain a two-cell structure feature descriptor for describing the feature of the two-cell structure, wherein the two-cell structure feature descriptor is one bit binary value, and the generating step further comprises:

determining step for determining each of at least one specific-cell structure feature for the at least one image region based on the calculated feature space using a heuristic algorithm, wherein the specific-cell structure feature is a N-bit binary value, N corresponding to the number of two-cell structure feature descriptors constituting the specific-cell structure feature and the value of each bit in the N-bit binary value corresponding to one of N two-cell structure feature descriptors o included in the specific cell structure;

wherein the object classifier is generated from at least one specific-cell structure feature; and wherein N is larger than or equal to 1.

2. The method according to claim 1, wherein the center cell and the neighbor cell of the two-cell structure have the same or different width-to-length ratio.

3. The method according to claim 1, wherein the statistics of gradients is a value of a bin in the histogram of oriented gradients calculated in a cell.

4. The method according to claim 1, wherein N=4, and the determining step further comprises:

two-cell structure feature selecting step for selecting a first number of two-cell structure feature descriptors with low training error from the calculated feature space;

three-cell structure feature generating step for generating a second number of three-cell structure features with low training error from the selected first number of two-cell structure features; and specific cell structure feature determining step for determining the specific-cell structure feature based on the second number of three-cell structure features.

5. The method according to claim 4, wherein the three-cell structure feature generating step further comprises:

three-cell structure feature calculating step for calculating a three-cell structure feature from two two-cell structure feature descriptors in the selected first number of two-cell structure feature descriptors, the two two-cell structure feature descriptors respectively corresponding to two different two-cell structures with the same center cell and different neighbor cell, so as to obtain a plurality of three-cell structure features, wherein each of the plurality of three-cell structure features is a two-bit binary value, each bit corresponding to a two-cell structure feature descriptor used for calculating the three-cell structure feature, and wherein the second number of three-cell structure features with low training error are selected from the plurality of three-cell structure features.

6. The method according to claim 5, wherein the specific-cell structure feature determining step further comprises:

three-cell structure feature combining step for combining any two three-cell structure feature included in the second number of three-cell structure features to obtain a plurality of combined cell structure features, wherein the feature of one combined cell structure feature is a four-bit binary value, each bit corresponding to the two-cell structure feature descriptor of one of the two two-cell structure feature descriptors included in one of the corresponding two three-cell structure features, and selecting step for selecting a combined cell structure feature with lowest training error from the plurality of combined cell structures as the specific-cell structure feature.

7. A method for identifying object in an image region, comprising:

input step for inputting an image region to be identified;

identifying step for identifying whether there exists an object to be identified in the image region by applying the classifier generated by the method according to claim 1.

8. The method according to claim 7, wherein the identifying step further comprises:

feature obtaining step for obtaining at least one feature of the image region to be identified according to the generated classifier;

comparing step for comparing a value obtained by processing the at least one feature according to the classifier with a corresponding threshold of the classifier so as to identify whether there exists an object to be identified in the image region.

9. The method according to claim 8, wherein the feature obtaining step further includes determining at least one specific-cell structure in the image region to be identified corresponding to the object classifier with reference to attribute information thereof and obtaining the features of the at least one specific-cell structure as the features of the image region, wherein, the attribute information of the object classifier is information on two-cell structures included a cell structure corresponding to the object classifier, the information on a two-cell structure comprising combination information of the two-cell structure, the position information of the cells included in the two-cell structure, and the information on the bin of the cells included in the two-cell structure in which the histogram of oriented gradients is calculated.

10. The method according to claim 8, wherein the position information comprises coordinates of the upper left corner of the cell.

11. An apparatus for generating an object classifier for at least one image region, wherein each image region in the at least one image region includes at least one two-cell structures, and each two-cell structure is composed of a center cell and a neighbor cell which is one of eight cells around and adjacent to the center cell, the apparatus comprising:

feature space calculating unit configured to calculate a feature space by using a descriptor generation for generating a two-cell structure feature descriptor for each of the at least one two-cell structure included in each of the at least one image region; and generating unit configured to generate the object classifier based on the determined feature space, wherein the descriptor generation apparatus comprises:

calculating unit configured to calculate statistics of gradients in the center cell and the neighbor cell respectively; and comparing unit configured to compare the calculated statistics of gradients in the center cell and the neighbor cell, so as to obtain a two-cell structure feature descriptor for describing the feature of the two-cell structure, wherein the two-cell structure feature descriptor is one bit binary value, and the generating unit further comprises:

determining unit configured to determine each of at least one specific-cell structure feature for the at least one image region based on the calculated feature space using a heuristic algorithm, wherein the specific-cell structure feature is a N-bit binary value, N corresponding to the number of two-cell structure feature descriptors constituting the specific-cell structure feature and the value of each bit in the N-bit binary value corresponding to one of N two-cell structure feature descriptors o included in the specific cell structure;

wherein the object classifier is generated from at least one specific-cell structure feature; and wherein N is larger than or equal to 1.

12. The apparatus according to claim 11, wherein the center cell and the neighbor cell of the two-cell structure have the same or different width-to-length ratio.

13. The apparatus according to claim 11, wherein the statistics of gradients is a value of a bin in the histogram of oriented gradients calculated in a cell.

14. The apparatus according to claim 11, wherein N=4, and the determining unit further comprises:

two-cell structure feature selecting unit configured to select a first number of two-cell structure feature descriptors with low training error from the calculated feature space;

three-cell structure feature generating unit configured to generate a second number of three-cell structure features with low training error from the selected first number of two-cell structure features; and specific cell structure feature determining unit configured to determine the specific-cell structure feature based on the second number of three-cell structure features.

15. The apparatus according to claim 14, wherein the three-cell structure feature generating unit further comprises:

three-cell structure feature calculating unit configured to calculate a three-cell structure feature from two two-cell structure feature descriptors in the selected first number of two-cell structure feature descriptors, the two two-cell structure feature descriptors respectively corresponding to two different two-cell structures with the same center cell and different neighbor cell, so as to obtain a plurality of three-cell structure features, wherein each of the plurality of three-cell structure features is a two-bit binary value, each bit corresponding to a two-cell structure feature descriptor used for calculating the three-cell structure feature, and wherein the second number of three-cell structure features with low training error are selected from the plurality of three-cell structure features.

16. The apparatus according to claim 15, wherein the specific-cell structure feature determining unit further comprises:

three-cell structure feature combining unit configured to combine any two three-cell structure feature included in the second number of three-cell structure features to obtain a plurality of combined cell structure features, wherein the feature of one combined cell structure feature is a four-bit binary value, each bit corresponding to the two-cell structure feature descriptor of one of the two two-cell structure feature descriptors included in one of the corresponding two three-cell structure features, and selecting unit configured to select a combined cell structure feature with lowest training error from the plurality of combined cell structures as the specific-cell structure feature.

17. An apparatus for identifying object in an image region, comprising:

input unit configured to input an image region to be identified;

identifying unit configured to identify whether there exists an object to be identified in the image region by applying the classifier generated by the apparatus according to claim 11.

18. The apparatus according to claim 17, wherein the identifying unit further comprises:

feature obtaining unit configured to obtain at least one feature of the image region to be identified according to the generated classifier;

comparing unit configured to compare a value obtained by processing the at least one feature according to the classifier with a corresponding threshold of the classifier so as to identify whether there exists an object to be identified in the image region.

19. The apparatus according to claim 18, wherein the feature obtaining unit further includes a unit configured to determine at least one specific-cell structure in the image region to be identified corresponding to the object classifier with reference to attribute information thereof and obtain the features of the at least one specific-cell structure as the features of the image region, wherein, the attribute information of the object classifier is information on two-cell structures included a cell structure corresponding to the object classifier, the information on a two-cell structure comprising combination information of the two-cell structure, the position information of the cells included in the two-cell structure, and the information on the bin of the cells included in the two-cell structure in which the histogram of oriented gradients is calculated.

20. The apparatus according to claim 19, wherein the position information comprises coordinates of the upper left corner of the cell.

* * * * *